July 5, 1966 D. W. ROPER 3,259,220
ROTATABLE COUPLING
Filed Feb. 25, 1964 2 Sheets-Sheet 1

INVENTOR.
DANIEL W. ROPER
BY Williams, David,
Hoffmann & Yount
ATTORNEYS

July 5, 1966    D. W. ROPER    3,259,220
ROTATABLE COUPLING
Filed Feb. 25, 1964    2 Sheets-Sheet 2
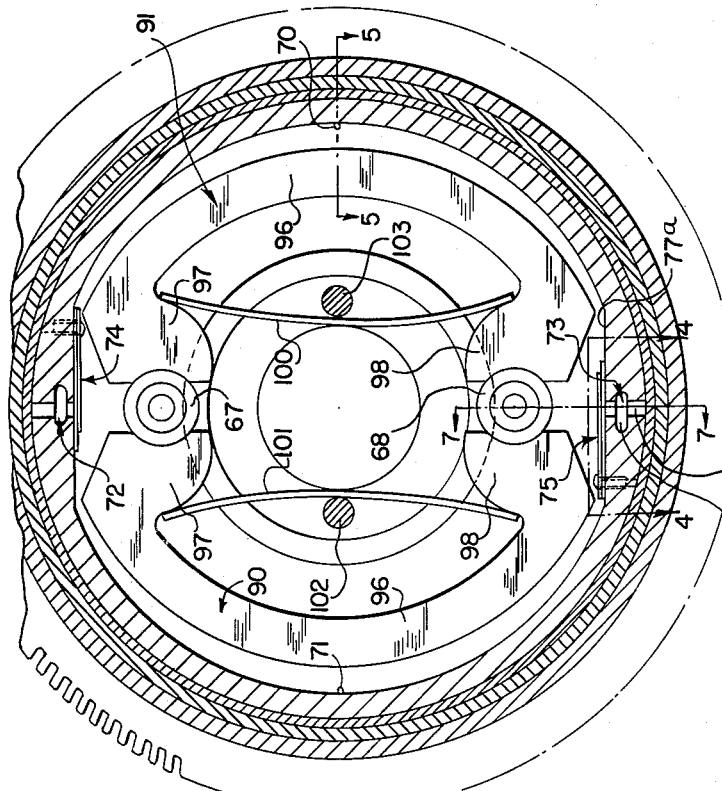
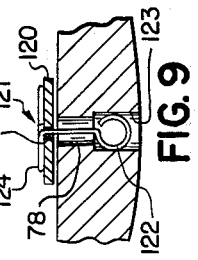
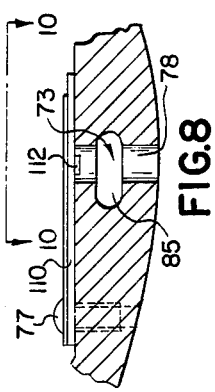
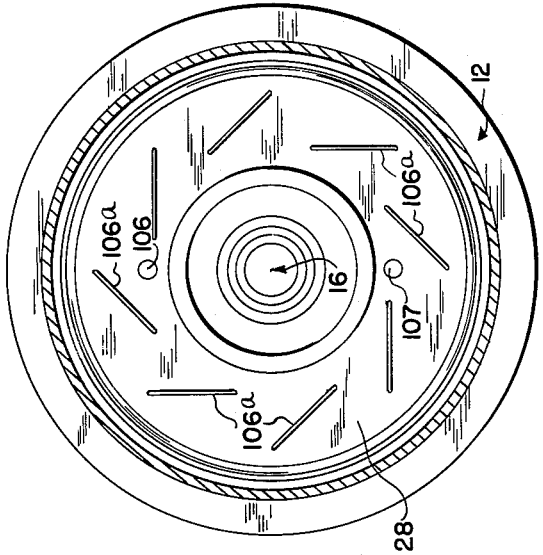
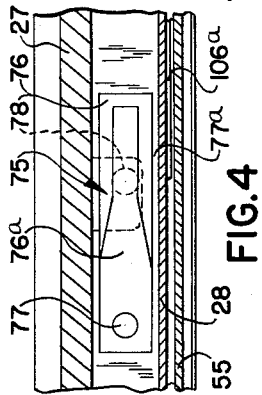
INVENTOR.
DANIEL W. ROPER
BY Williams, David,
Hoffmann & Yount
ATTORNEYS

United States Patent Office 3,259,220
Patented July 5, 1966

3,259,220
ROTATABLE COUPLING
Daniel W. Roper, Rochester, Mich., assignor to Eaton Manufacturing Company, Cleveland, Ohio, a corporation of Ohio
Filed Feb. 25, 1964, Ser. No. 347,135
15 Claims. (Cl. 192—58)

This invention relates to a fluid coupling, and particularly to a viscous fluid coupling of the type utilizing a viscous shear fluid for transmitting torque between coupling members. Such fluid couplings may be used for driving different load devices. One primary use for such fluid couplings is in driving a cooling fan accessory for an internal combustion engine of a vehicle.

Known fluid couplings used for driving fan devices associated with an engine are constructed so as to operate to control the operating characteristics of the fan or output speed of the coupling. It is desirable in such fluid couplings to control acceleration of the output member upon acceleration of the input member so that fan acceleration lags engine acceleration and thus, engine noise hides fan noise. On the other hand, it is also desirable that upon deceleration of the input coupling member, the output coupling member is quickly decelerated. Moreover, at high input speeds, the coupling capacity of such a fluid coupling should be increased so as to obtain maximum possible output or fan speed.

Accordingly, the principal object of the present invention is the provision of a new improved viscous shear type fluid coupling which is simple in construction, reliable in operation, and operative to delay acceleration of the output member upon acceleration of the input member, and yet quickly effects deceleration of the output member upon deceleration of the input member, and wherein the coupling capacity is increased at high input speeds.

A further object of the present invention is the provision of a new and improved viscous coupling having a viscous fluid shear space defined by surface portions of the first and second coupling member and wherein viscous fluid is added to the shear space in a metered controlled flow in response to acceleration of the input coupling member and fluid is removed from the shear space at a relatively rapid rate upon deceleration of the input coupling member.

A further object of the present invention is the provision of a new and improved fluid coupling of the shear type wherein the fluid which flows to and from the shear space flows from and into a reservoir chamber carried by the input coupling member and which rotates with the input member so that the pressure of the fluid in the reservoir chamber is a function of the speed of rotation of the input member.

A further object of the present invention is the provision of a new and improved fluid coupling of the shear type having a shear space to which fluid flows from a reservoir chamber carried by the input coupling member, and upon deceleration of the input coupling member, fluid flows from the shear space to the reservoir chamber through a fluid passageway controlled by a valve member which moves to an open position upon deceleration of the input coupling member.

A further object of the present invention is the provision of a new and improved shear coupling having a reservoir chamber carried by the input coupling member from which fluid flows into a shear space and wherein the centrifugal head or pressure of the fluid in the reservoir chamber varies upon acceleration of the input coupling member and wherein displacer means is provided in the reservoir chamber and are movable therein to displace fluid therein and thereby increase the centrifugal pressure of the fluid in the reservoir chamber at a predetermined high input speed to increase the coupling capacity at the high input speed.

A further object of the present invention is the provision of a new and improved fluid coupling of the shear type wherein the fluid coupling includes an input coupling member carrying a fluid reservoir chamber and an output coupling member defining a housing surrounding the input coupling member, and wherein the input member has a plurality of pumping vanes mounted on the outside thereof remote from the shear space of the coupling to prevent fluid from flowing from the portion of the operating chamber adjacent the shear space into the space between the outer surface of the input coupling member and the adjacent surface of the output coupling member.

Further objects and advantages of the present invention will be apparent to those skilled in the art to which it relates from the detailed description of the preferred embodiment thereof made with reference to the accompanying drawings in which:

FIG. 2 is a transverse sectional view of the fluid coupling shown in FIG. 1 taken approximately along the section line 2—2 of FIG. 1;

FIG. 3 is a transverse sectional view of the fluid coupling shown in FIG. 1 taken approximately along the section line 3—3 of FIG. 1;

FIG. 4 is a fragmentary sectional view of the fluid coupling shown in FIG. 2 taken approximately along the section line 4—4 of FIG. 2;

FIG. 8 is a fragmentary sectional view of a fluid coupling embodying the present invention, but of a modified construction;

FIG. 9 is a fragmentary sectional view of another fluid coupling embodying the present invention, but of still another modified construction.

Figure 1:
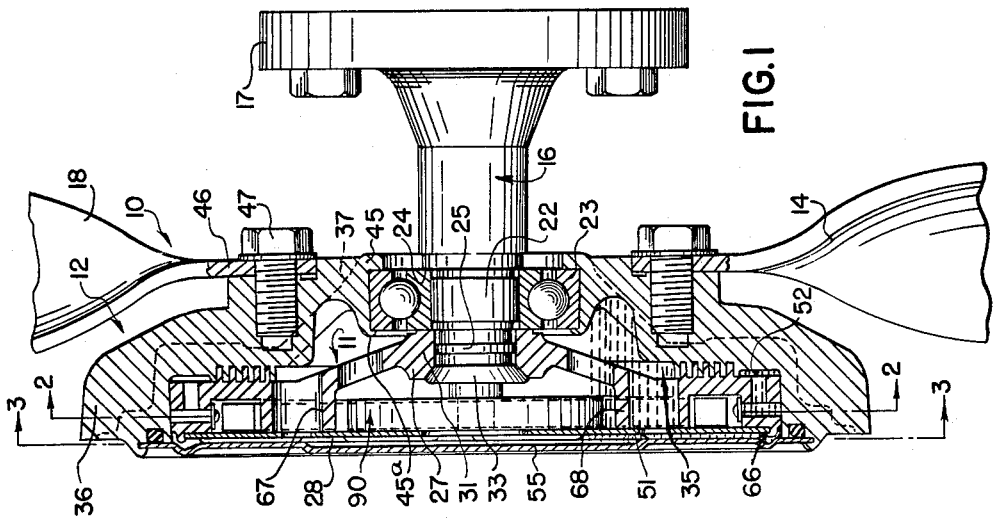
FIG. 1 is an axial sectional view of a fluid coupling embodying the present invention.

The present invention, as embodied herein, provides a fluid coupling for driving a cooling fan device for an internal combustion engine. The fluid coupling is constructed so as to delay acceleration of the output coupling member upon acceleration of the input coupling member so as to cause fan noise, which results from acceleration of the output coupling member, to be delayed or lag behind engine noise and to thus be hidden thereby. Upon deceleration of the input member, however, the output member is rapidly decelerated. It should be understood, however, that the fluid coupling of the present invention may be utilized in any drive arrangement wherein it is desired to have acceleration of the output coupling member lag or be delayed relative to acceleration of the input coupling member.

The drawings illustrate the present invention as being preferably embodied in a fluid coupling 10. The fluid coupling 10 comprises an input coupling member 11 and an output coupling member 12. The coupling 10 is shown as a drive for a cooling fan device of an internal combustion engine, not shown, and includes cooling fan blades 14 and 18 which are driven from the engine through the fluid coupling 10.

The fluid coupling 10 includes an input shaft 16 on which input member 11 is mounted and which is rotatable by a suitable drive means such as a pulley member (not shown) driven from the engine. The input shaft 16 includes a flange portion 17 at one end thereof adapted to be secured to the pulley member. The shaft 16 further includes intermediate its ends, a reduced shaft portion 22 functioning as a support for the inner race of a ball bearing assembly 23. A shoulder 24 on the shaft 16 prevents movement of the ball bearing assembly in one direction, namely to the right, as viewed in FIG. 1. Another shaft portion 25 is provided with surface serrations.

The rotatable input or driving coupling member 11 of the fluid coupling 10 includes a disk like member 27 having a hub portion 31 supported on the shaft 16, and a cover member 28 secured to the disk member 27, as will be described hereinbelow. The hub portion 31 has an opening therethrough which has an interference fit with the shaft portion 25. Hub portion 31 is pressed onto the shaft 16 until the inner surface of the hub 31 abuts the side of the inner race of the ball bearing assembly 23 and thus prevents movement of the ball bearing assembly 23 to the left, as viewed in FIG. 1. The left end of the shaft 16 is flared or "balled over" at 33 so as to hold the input coupling member from movement toward the left, as viewed in FIG. 1. From the above description it should be apparent that rotation of shaft 16 causes the input coupling 11 to be rotated therewith.

The input coupling member 11 rotates in a fluid working or operating chamber 35 formed by the rotatable output or driven coupling member 12. The output coupling member 12 is in the form of a housing and includes a main housing member 36 having a hub portion 37 which has an opening therethrough. The opening through the hub portion 37 has an interference fit with the outer race of the ball bearing assembly 23 and is supported thereby for rotation about the axis of the shaft 16. A flange portion 45 of the housing 36 engages the right side of the outer race of the ball bearing assembly 23, as viewed in FIG. 1, and blocks housing member 36 from movement in one axial direction. A portion of the housing member is spun over, as indicated at 45a, to engage the left side of the outer race of the ball bearing assembly 23, as viewed in FIG. 1. The fan blades 14 and 18 are secured to surface portions 46 of the housing member 36 by stud and nut assemblies 47, so as to rotate with the housing member 36.

The fluid operating chamber 35 formed by the output coupling member 12 is defined by an axially extending annular surface portion 50 and a pair of radially extending axially spaced surfaces 51, 52. The surface 51 is provided by an outer cover member 55 which covers or engages the left side as viewed in the drawings of the output coupling member 12. The surface 52 is provided with a plurality of lands and grooves which interfit with, and are interdigitated with cooperating lands and grooves on the axially adjacent surface of the input coupling member 11. The cooperating lands and grooves provide axially spaced parallel surfaces which define a shear space 56 therebetween forming a portion of the operating chamber 35. The spaced surfaces provided by the lands and grooves are cooperable with a fluid shear medium, such as silicone fluid, to effect the transmission of torque from the input coupling member 11 to the output coupling member 12.

As is well known to those skilled in the fluid coupling art to which the present invention relates, the amount of torque transmitted from the input coupling member to the output coupling member 12 is a function of the volume of fluid in the shear space 56 defined by the above-noted lands and grooves, and specifically is a function of the number of lands and grooves which are covered by the fluid. In the event that no fluid is located in the shear space 56 defined by the lands and grooves, no torque is transmitted thereby between the input and output coupling members. On the other hand, when fluid fills, or partially fills, the shear space, torque is transmitted thereby and as the amount of fluid in the shear space increases, an increasing amount of torque is transmitted between the input and output coupling members.

The fluid coupling of the present invention is constructed so as to be operable to vary the amount of fluid in the shear space 56 to thereby control the output speed of the coupling. To this end, the input coupling member 11 carries and includes means defining a fluid reservoir chamber 60 and is provided with suitable passageways to be described in detail hereinbelow which function to direct fluid into the shear space from the reservoir chamber and from the shear space back into the reservoir chamber.

The input coupling member 11 comprises, as noted above, a main coupling member 27 which is dish shaped and in one axial side of which the lands and grooves, above described, are formed. The recess which is formed by the dish shaped member 27 is closed by the coupling member 28 which forms a cover member and which is secured to the coupling member 27 by rolling over the outer peripheral portion thereof as shown at 66. When secured to the main coupling member 27, the cover or coupling member 28 engages, or is spaced only slightly from, annular projections 67, 68 which are circular in cross section and which project axially of the coupling member 27 at diametrically opposed portions thereof. The projections 67, 68 function as spacers and space the coupling member 28 from the coupling member 27. The reservoir chamber 60 comprises the volume or area between the coupling member 28 and the dish shaped member 27. It should be apparent from the above description that the reservoir chamber 60 and the fluid therein is rotatable with the input coupling member 11. Rotation of the reservoir chamber 60 provides the fluid in the reservoir chamber with a centrifugal head or pressure which is a function of the speed of rotation of the input coupling member 11.

As noted hereinabove, suitable passageways are provided for directing fluid from the fluid reservoir chamber into the operating chamber 35, and specifically into the shear space 56 defined by the lands and grooves. The fluid is directed from the reservoir chamber into the operating chamber 35 through a pair of diametrically opposed orifice openings 70, 71, in the coupling member 27 which extend axially thereof and communicate at one end with the extreme radial outermost portion of the reservoir chamber and at the other end with the operating chamber 35 radially outwardly of the outermost groove defining the shear space 56. The orifice openings 70, 71 direct fluid from the reservoir chamber into the operating chamber 35 to increase the volume of fluid in the shear space 56, and are so sized as to provide a metered or controlled flow of fluid from the reservoir chamber 60. The operation and conditions under which fluid flows through the orifice openings 70, 71 will be described in detail hereinbelow.

The fluid in the operating chamber 35 and shear space flows back into the reservoir chamber 60 to decrease the torque transmitted to the output member. This fluid flows through diametrically spaced fluid passageway means 72, 73 into the reservoir chamber. Valve means 74, 75 are associated with the passageway means 72, 73, respectively, and provide for fluid flow into the reservoir chamber through their associated passageway means but not from the reservoir chamber. Each passageway means 72, 73 and valve means 74, 75 may take any suitable form and are of identical construction and only one valve 74 and passageway means 72 will be described in detail and similar reference numbers will be used to designate corresponding parts of the valve means 75 and passageway means 73.

Figure 7:
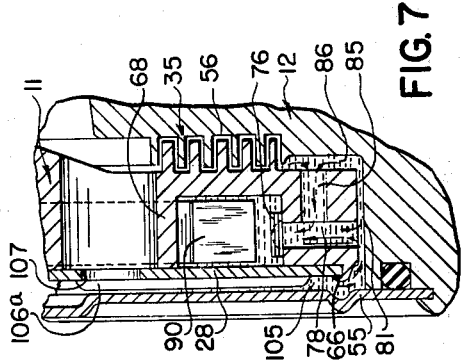
FIG. 7 is an enlarged fragmentary sectional view of the fluid coupling shown in FIG. 2 taken approximately along the section line 7—7 of FIG. 2.

As shown in FIGS. 4 and 7 of the drawings, the valve means 74 is of the reed valve type and comprises a reed valve member 76 which is supported internally of the reservoir chamber. The reed valve member 76 is secured to the input coupling member by a suitable fastening means 77, and the reed member 76 is flexible so as to pivot about the fastening means 77. A suitable spring finger 76a is associated with the reed valve member 77 and biases it into engagement with a valve seat 77a. The end of the reed valve member remote from the fastening means 77 normally engages the valve seat 77a and covers a radially extending fluid passageway 78 in the input coupling member 11 forming a part of passageway means 72. The fluid passageway 78 communicates with the reservoir chamber when the reed valve member 76 is moved away from its closed position and communicates at its other end with an operating chamber portion 81 defined in part by the outer periphery of the input coupling member 11 and the surface 50 of the housing member 56. The passageway 78 communicates also with an axially extending passageway 85 which communicates with an operating chamber portion 86 located immediately radially outward of the shear space 56. The fluid passageways 78, 85 form the fluid passageway means 72 noted above.

The operation of the fluid coupling, as described hereinabove, should be apparent to one skilled in the art. When the fluid coupling 10 is at rest, the silicone fluid in the operating and reservoir chambers takes the position illustrated in FIG. 1 wherein it lies in the lower peripheral portion of the fluid coupling. As the input coupling member 11 begins to rotate, the fluid will be dragged by the input coupling member 11 around the outer periphery of the coupling members and torque will be transmitted from the input coupling member to the output coupling member 12 by the silicone fluid. As noted hereinabove, the amount of torque which is transmitted will be a function of the fluid in the shear space 56 defined by the lands and grooves. As the coupling rotates, the fluid in the reservoir and operating chambers will seek an equilibrium condition wherein the fluid pressures in the reservoir and operating chambers are substantially equal.

Figure 6:
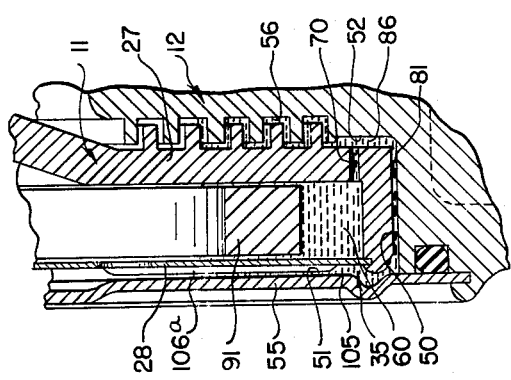
FIG. 6 is a fragmentary sectional view of the fluid coupling similar to FIG. 5 but illustrating a different level of fluid in the fluid coupling.
Figure 5:
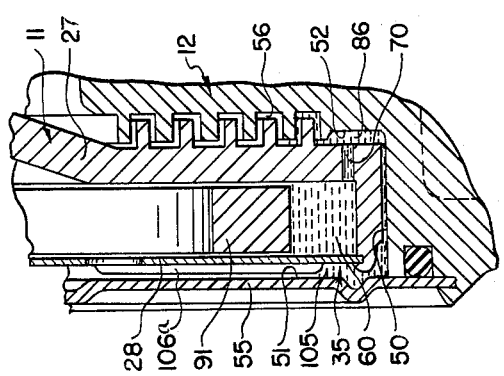
FIG. 5 is a fragmentary sectional view of the fluid coupling shown in FIG. 2 taken approximately along the section line 5—5 of FIG. 2.
Figure 10:
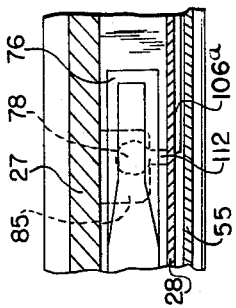
FIG. 10 is a top plan view, partially in section, of the apparatus of FIG. 8 looking at the apparatus of FIG. 8 as indicated by the line 10—10.

Upon acceleration of the input coupling member 11 with the coupling in an equilibrium condition, the reservoir chamber 60 is accelerated along with the fluid therein, and the centrifugal head or pressure of the fluid in the reservoir chamber 60 is increased. This increase in pressure in the reservoir chamber 60 destroys the equilibrium condition and forces fluid through the orifices 70, 71 into the operating chamber portions 81 and 86 and thereby increases the volume of fluid in the shear spaces and effects a greater torque transmission. However, since the orifices 70, 71 are of a predetermined size so as to provide a metered flow of fluid therethrough, the flow rate into the shear space is restricted. Of course, after a predetermined time interval, the centrifugal pressure of the fluid in the reservoir chamber 60 equals the pressure in the operating chamber and flow ceases and equilibrium is again achieved, but with a greater volume of fluid in the shear space 56 and higher fan speed. FIG. 5 shows the fluid level in the shear space 56 at a relatively low speed and at equilibrium condition, while FIG. 6 shows the fluid level in the shear space 56 after acceleration and at a higher speed.

Because of the above noted time interval before equilibrium is again achieved, acceleration of the output member and fan is delayed behind acceleration of the input coupling member and acceleration of the engine which drives the input coupling member. Thus, engine noise will reach a predetermined noise level prior to fan noise reaching an objectionable level. As a result, the engine noise will hide the fan noise. The length of time between an increase in the speed of the input member and the output member reaching its corresponding speed is a function of the size of the orifice openings 70, 71. The greater the opening size, the greater the flow rate and the shorter the time interval. The smaller the openings, the lower the flow rate and the greater the delay.

Upon deceleration of the input coupling member 11, fluids flows from the shear space into the reservoir chamber 60 through the fluid passageways 78, 85 and orifices 70, 71. When the fluid coupling is in an equilibrium condition and the input coupling member 11 decelerates, the centrifugal head or pressure of the fluid in the reservoir chamber 60 is decreased, thus destroying the equilibrium condition and causing fluid to flow from the operating chamber and shear space into the reservoir chamber 60 through the orifices 70, 71. The orifices 70, 71 are of a restricted size and flow therethrough is not sufficiently rapid to reduce the speed of the fan at the desired rate. The passageways 78, 85 provide for rapid fluid flow from the operating chamber and shear space into the reservoir chamber. The fluid flows from the chamber 86 through the passageway 85 and passageway 80 to the reed valve member 76, which, of course, due to the differential in the pressures on the opposite sides thereof, opens permitting fluid to flow therethrough. Fluid flows from the operating chamber and shear space into the reservoir chamber 60 until an equilibrium condition is achieved again wherein the pressure in the reservoir and operating chambers are equal, at which time the reed valve member closes to block further fluid flow.

At high input speeds, the capacity of the fluid coupling 10 is increased so as to obtain maximum output or fan speed. Accordingly, the fluid coupling 10 includes means for increasing the centrifugal head of the fluid in the reservoir chamber at a given predetermined input speed. This means is in the form of displacer members 90, 91 which are located in the reservoir chamber 60 and are movable therein to vary the centrifugal head of the fluid in the reservoir chamber, as will be descriped hereinbelow. Each of the displacer members includes an annular arch-like portion 96 having its opposite ends connected to base portions 97, 98. The base portions 97, 98 engage the projections 67, 68, respectively.

Suitable leaf spring members 100, 101 are associated with the displacer members 90, 91, respectively, and bias the displacer members radially inwardly. The spring members 100, 101 are positioned with their central portions in engagement with pin members 102, 103 which are secured to the coupling member 27 and their outer end portions engage the base portions 97, 98 of the displacer members and bias the displacer members into engagement with the projections 67, 68.

Upon acceleration of the input coupling member, the displacer members 90, 91, due to centrifugal force, tend to move outwardly of the input coupling member 11 against the bias of the spring members 100, 101. When the rotational speed of the input member increases to a predetermined point, the centrifugal force is sufficiently great to cause the displacer members to move radially outwardly against the spring members. In moving outwardly of the input coupling member in the reservoir chamber 60, the displacer members displace fluid in the reservoir chamber, causing the fluid in the reservoir chamber 60 to achieve a relatively high columnar height. This increased column of fluid and the new position of the displacer members causes an increase in the centrifugal head of the fluid in the reservoir chamber 60 and provides an increased fluid flow through the orifices 70, 71 to increase the capacity of the coupling. The operation of the displacers can be varied by varying the size and capacity of the springs. Moreover, by varying the size of the displacers, the amount of fluid displaced can be varied.

The fluid coupling 10, as described hereinabove, provides for fluid flow into and from the shear space 56, and the shear space 56 communicates with operating chamber portion 105 located on the axial side of the input coupling member between the cover member 28 of the reservoir chamber and the outer cover member 55 of the operating chamber. In order to minimize flow of fluid into this portion of the operating chamber and maintain the fluid in the shear space 56, the outer cover member 28 is provided with a plurality of pumping vane members 106a which extend at an angle to the axis of roation of the coupling member 11 so as to pump fluid which tends to flow into chamber portion 105 radially outwardly thereof. Thus, these vane members 106a tend to prevent fluid from flowing from the shear space 56 into the remote portions of the operating chamber.

From the above description, it should be apparent that the fluid coupling 10 operates to increase the amount of fluid in the operating chamber upon acceleration of the input coupling member and to decrease the amount of fluid in the operating chamber upon deceleration of the input coupling member. When the input coupling member is decelerated and stopped, fluid drains down or flows into the lower portion of the coupling, as illustrated in FIG. 1. Under this condition it is possible for a greater volume of fluid to drain into the reservoir chamber 60 than could collect there while the unit is rotating. This is due to the geometry of the chambers and could vary considerably with different chamber configurations. When this excess amount of fluid drains into the reservoir chamber and the coupling is accelerated up to operating speed, the operating chamber will contain less fluid than is normally required for statisfactory operation. When the speed reaches the point at which the displacers 90, 91 move outward at higher input speed, as described above, the level of the fluid is increased to a column height which would be greater than the column height which would be reached if the correct amount of fluid were in the reservoir chamber 60. The holes 106 and 107 are located at a given distance from the center of rotation so that if the correct amount of fluid is in the reservoir chamber 60 when the displacers move outward, the column height will approach the position of the holes but no fluid will leak out. If, however, an excess amount of fluid is in the reservoir, the fluid column height will reach the holes 106 and 107 and this excess fluid will spill out of the holes into the working chamber. It can be seen then, that if the distribution of fluid is upset by the drain down condition described above, this conditon will be corrected when the coupling is operated at a speed where the displacers move outward. The fluid column heights either in the coupling chamber or in the reservoir chamber should never reach the location of these spill holes at any other time during normal operation.

A modified embodiment of the present invention is illustrated in FIG. 8 wherein the valve means for controlling the flow of fluid from the operating chamber into the reservoir chamber and the orifice openings for directing fluid from the reservoir into the operating chamber are associated in a manner different than that described above. As shown in FIG. 8, the valve means which moves to open the fluid return hole 78 and permit the flow of fluid into the reservoir chamber 60 is substantially the same as that disclosed and described hereinabove, and comprises a reed valve member 110 which is pivotally secured to the input coupling member 11, and when moved to an open position, permits the flow of fluid at a rapid rate into the reservoir chamber 60 from the operating chamber 35. An orifice opening 112 communicating the reservoir chamber and the operating chamber when the reed valve member 110 is in its closed position, communicates with the return hole 78 and the reservoir chamber 60 when the reed valve is in its closed position. The orifice is in the form of a recess formed in the valve seat and communicates at one end with the return hole 78 and extends transversely of the reed valve member 110 and beyond the reed valve member 110 and communicates with the reservoir chamber 60. Thus, it can be seen that the recess 112 in the reed valve seat provides for the flow of fluid from the reservoir chamber through the return hole into the fluid operating chamber upon acceleration of the input coupling member, as described in detail hereinabove with respect to FIGS. 1–7. It should be apparent also that the orifice or recess 112 may be formed in the reed valve member itself rather than in the reed valve seat as shown in FIG. 8. In such a modification, the reed valve may be provided with a small drilled hole which communicates with the return hole and with the upper surface of the reed valve member.

FIG. 9 shows still another modification of a fluid coupling embodying the present invention and wherein the valve mechanism for controlling the flow of fluid between the operating and reservoir chambers if of still a different construction. The valve means, as shown in FIG. 9, comprises a valve member 120 which is movable radially of the input coupling member to uncover the return passageway 78 which communicates the operating chamber 35 and the reservoir chamber 60. The valve member 120 is held in its closed position by a suitable spring wire snap 121 which has a retaining portion 122 located in an enlarged recess 123 in the outer periphery of the input coupling member. The inner end of the spring wire snap 121 is provided with an enlarged portion 124 which engages the upper surface of the valve member, as shown in FIG. 9. The central portion of the spring wire snap extends through an orifice 125 in the valve member 120 which functions as a metering orifice, as described hereinabove, to provide for fluid flow into the operating chamber upon acceleration of the input coupling member. Upon deceleration of the input coupling member, the valve member 120 will move away from the return hole and provide for rapid flow of fluid back into the reservoir chamber from the operating chamber.

It should be understood that the above description has been made in considerable detail and that certain modifications, changes and adaptations may be made therein by those skilled in the art and is intended hereby to cover all such changes, modifications and adaptations as fall within the scope of the appended claims.

Having described my invention, I claim:

1. A fluid coupling of the shear type having first and second coupling members, said first coupling member defining a fluid operating chamber having a first fluid pressure therein when said coupling members rotate, said second coupling member being rotatable in said fluid operating chamber, said first and second coupling members having opposed spaced surface portions defining a fluid shear space therebetween and cooperable with a fluid shear medium in the shear space to effect the transmission of torque between the coupling members, a fluid reservoir chamber carried by the second coupling member and having a second fluid pressure therein when said coupling members are rotating, means communicating the fluid reservoir chamber with said shear space to direct fluid flow therebetween, and valve means associated with said communicating means and operable in response to a differential in the first and second pressures to provide for fluid flow between said shear space and said fluid reservoir chamber.

2. A fluid coupling of the shear type including first and second relatively rotatable coupling members, said first coupling member defining a fluid operating chamber, said second coupling member defining a fluid reservoir chamber and rotatable in said fluid operating chamber, fluid passageway means communicating the fluid reservoir chamber with the fluid operating chamber and providing for fluid flow therebetween, displacer members supported by said second coupling member and located in said reservoir chamber, and spring means biasing said displacer members radially inwardly and yieldable to permit movement of said displacer members radially outwardly in said reservoir chamber upon said second coupling member rotating at a predetermined speed.

3. A fluid coupling of the shear type including first and second coupling members, said first coupling member defining a fluid reservoir chamber, said second coupling member defining a fluid operating chamber in which said first coupling member is rotatable, said first and second coupling members having opposed spaced parallel surface portions defining therebetween a fluid shear space forming a portion of said operating chamber, fluid passageway means communicating said fluid reservoir chamber with a portion of said fluid operating chamber adjacent to said shear space, and pump means operatively associated with said first coupling member for maintaining the fluid in said operating chamber in the shear space portion thereof.

4. A fluid coupling of the shear type comprising a first coupling member in the form of a housing defining a fluid operating chamber, a second coupling member rotatable in said fluid operating chamber and having first and second axially spaced portions of the fluid operating chamber on opposite sides thereof, said second coupling member including a pair of members defining a reservoir chamber, one of said members having surface portions in a spaced parallel relation with adjacent surface portions of said first coupling member and defining a fluid shear space therebetween and cooperable with a fluid shear medium in the shear space to transmit torque between said coupling members, said fluid shear space being located in said one portion of said operating chamber, fluid passageway means in said second coupling member and communicating said fluid reservoir chamber and said operating chamber and operable to direct fluid between said chambers, and pumping vane members supported by the second coupling member and extending into said second portion of said fluid operating chamber and at an angle to the axis of rotation of the coupling members for preventing the flow of fluid from the first operating chamber portion into the second operating chamber portion.

5. A fluid coupling of the shear type including first and second relatively rotatable coupling members, said first coupling member defining a fluid operating chamber in which said second coupling member is rotatable, said first and second coupling members having opposed spaced surfaces defining a fluid shear space therebetween and cooperable with a fluid shear medium in the shear space to effect the transmission of torque therebetween, fluid displacer members supported by said second coupling member and located in said fluid chamber and movable transversely to the axis of rotation relative to said second coupling member in response to a predetermined rotary speed of said second coupling member to vary the column height of the fluid in said chamber.

6. A fluid coupling of the shear type including first and second rotatable coupling members, said first coupling member defining a fluid operating chamber, said second coupling member being rotatable in said fluid operating chamber, said first and second coupling members having opposed spaced surface portions defining a fluid shear space therebetween in said operating chamber and cooperable with a fluid shear medium in the shear space to effect the transmission of torque between the coupling members, a fluid reservoir chamber carried by the second coupling member and rotatable therewith, first fluid passageway means communicating the fluid reservoir chamber with said shear space and providing for fluid flow from said reservoir chamber into said operating chamber, second fluid passageway means communicating said fluid reservoir chamber with said operating chamber and providing for fluid flow into said reservoir chamber from said operating chamber, said second fluid passageway means including a first passageway extending radially of said second coupling member and communicating with said reservoir chamber and the outermost periphery of said second coupling member, and a second fluid passageway extending axially of said second coupling member and communicating at one end with said first fluid passageway and at its other end with a portion of the operating chamber radially outwardly of said shear space.

7. A fluid coupling of the shear type including first and second rotatable coupling members, said first coupling member defining a fluid operating chamber, said second coupling member being rotatable in said fluid operating chamber, said first and second coupling members having opposed spaced surface portions defining a fluid shear space therebetween in said operating chamber and cooperable with a fluid shear medium in the shear space to effect the transmission of torque between the coupling members, a fluid reservoir chamber carried by the second coupling member and rotatable therewith, first fluid passageway means communicating the fluid reservoir chamber with said shear space and providing for fluid flow from said reservoir chamber into said operating chamber, second fluid passageway means communicating said fluid reservoir chamber with said operating chamber and providing for fluid flow into said reservoir chamber from said operating chamber, and displacer members movably supported within said reservoir chamber and movable therein in response to a predetermined rotational speed of said second coupling member.

8. A fluid coupling of the shear type including first and second rotatable coupling members, said first coupling member defining a fluid operating chamber, said second coupling member being rotatable in said fluid operating chamber, said first and second coupling members having opposed spaced surface portions defining a fluid shear space therebetween in said operating chamber and cooperable with a fluid shear medium in the shear space to effect the transmission of torque between the coupling members, a fluid reservoir chamber carried by the second coupling member and rotatable therewith, first fluid passageway means communicating the fluid reservoir chamber with said shear space and providing for fluid flow from said reservoir chamber into said operating chamber, second fluid passageway means communicating said fluid reservoir chamber with said operating chamber and providing for fluid flow into said reservoir chamber from said operating chamber, said second fluid coupling member further including vane members extending into said operating chamber and located axially of the first fluid passageway means on the side thereof remote from the shear space.

9. A fluid coupling of the shear type including first and second coupling members, said first coupling member defining a fluid reservoir chamber, said second coupling member defining a fluid operating chamber in which said first coupling member is rotatable, said first and second coupling members having opposed spaced parallel surface portions defining therebetween a fluid shear space forming a portion of said operating chamber, fluid passageway means communicating said fluid reservoir chamber with a portion of said fluid operating chamber adjacent to said shear space, and means operatively associated with said first coupling member for maintaining the fluid in said operating chamber in the shear space portion thereof and including vane members secured to said first coupling member and spaced axially of said shear space and rotatable with said coupling member, and upon rotation, minimizing fluid flow from said shear space to the remote portions of said operating chamber.

10. A fluid coupling of the shear type including first and second rotatable coupling members, said first coupling member defining a fluid operating chamber, said second coupling member being rotatable in said fluid operating chamber, said first and second coupling members having opposed spaced surface portions defining a fluid shear space therebetween forming a part of said operating chamber and cooperable with a fluid shear medium in the shear space to effect the transmission of torque between the coupling members, a fluid reservoir chamber carried by the second coupling member and rotatable therewith, fluid passageway means communicating the reservoir chamber with said shear space and providing for fluid flow into and from said reservoir chamber and a valve member operably associated with said fluid passageway means for blocking at least a part of the fluid passageway means and restricting the amount of fluid flowing from the reservoir chamber into the operating chamber, said valve member having an orifice opening located therein which communicates with the fluid passageway means when the valve member is in its closed position so as to provide for fluid flow from the reservoir chamber into the operating chamber when the valve member is in its closed position.

11. A fluid coupling of the shear type including first and second rotatable coupling members, said first coupling member defining a fluid operating chamber, said second coupling member being rotatable in said fluid operating chamber, said first and second coupling members having opposed spaced surface portions defining a fluid shear space therebetween forming a part of said operating chamber and cooperable with a fluid shear medium in the shear space to effect the transmission of torque between the coupling members, a fluid reservoir chamber carried by the second coupling member and rotatable therewith, fluid passageway means communicating the reservoir chamber with said shear space and providing for fluid flow into and from said reservoir chamber and a valve member operably associated with said fluid passageway means for blocking at least a part of the fluid passageway means and restricting the amount of fluid flowing from the reservoir chamber into the operating chamber, said valve member when in its closed position engages a valve seat, said valve seat being provided with a recess therein which communicates with the fluid passageway means and the fluid reservoir chamber when the valve member is in its closed position so as to provide for fluid flow from the reservoir chamber into the operating chamber when the valve member is in its closed position.

12. A fluid coupling of the shear type including first and second rotatable coupling members, said first coupling member defining a fluid operating chamber having a centrifugal fluid pressure therein when said coupling member rotates, said second coupling member being rotatable in said fluid operating chamber, said first and second coupling members having opposed spaced surface portions defining a fluid shear space therebetween in said operating chamber and cooperable with a fluid shear medium in the shear space to effect the transmission of torque between the coupling members, a fluid reservoir chamber carried by the second coupling member and having a centrifugal fluid pressure therein when said coupling member rotates, first fluid passageway means communicating the fluid reservoir chamber with said shear space and providing for fluid flow from said reservoir chamber into said operating chamber, second fluid passageway means communicating said fluid reservoir chamber with said operating chamber and providing for fluid flow into said reservoir chamber from said operating chamber, valve means associated with said second fluid passageway means and operable in response to a differential in the centrifugal pressures in said chambers to provide for fluid flow through said second passageway means.

13. A fluid coupling as defined in claim 12 wherein said first passageway means includes a pair of diametrically opposed orifice openings in said second coupling member extending axially of said second coupling member and communicating with said operating chamber adjacent to said shear space portion thereof.

14. A fluid coupling of the shear type as defined in claim 12 wherein said second fluid passageway means comprises fluid conducting conduit means communicating with the reservoir chamber and the operating chamber, and said valve means is associated with said conduit means and operates to close said conduit means to block the flow of fluid through said conduit means into said reservoir chamber when the centrifugal pressure in said reservoir chamber is equal to, or greater than, the centrifugal pressure in said operating chamber.

15. A fluid coupling as defined in claim 14 wherein said valve means further includes a valve member supported by said second coupling member within said reservoir chamber and which is movable relative to said first coupling member into and out of blocking engagement with said conduit means, depending upon the fluid pressures acting on said member.

References Cited by the Examiner
UNITED STATES PATENTS 2,792,095   5/1957   Sherman _____ 192—58

DAVID J. WILLIAMOWSKY, *Primary Examiner.*

DON A. WAITE, *Examiner.*

A. T. McKEON, *Assistant Examiner.*